United States Patent
Ma et al.

(10) Patent No.: US 9,827,758 B2
(45) Date of Patent: Nov. 28, 2017

(54) FILM STRIPPING DEVICE AND FILM STRIPPING METHOD

(71) Applicants: BOE Technology Group Co., Ltd., Beijing (CN); BOE (Hebei) Mobile Display Technology Co., Ltd., Hebei (CN)

(72) Inventors: Nan Ma, Beijing (CN); Hongqian Cai, Beijing (CN); Jianjun Pang, Beijing (CN)

(73) Assignees: BOE TECHNOLOGY GROUP CO., LTD., Beijing (CN); BOE (HEBEI) MOBILE DISPLAY TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 15/037,112

(22) PCT Filed: Nov. 3, 2015

(86) PCT No.: PCT/CN2015/093677
§ 371 (c)(1),
(2) Date: May 17, 2016

(87) PCT Pub. No.: WO2016/184043
PCT Pub. Date: Nov. 24, 2016

(65) Prior Publication Data
US 2017/0120570 A1    May 4, 2017

(30) Foreign Application Priority Data

May 15, 2015  (CN) .......................... 2015 1 0250995

(51) Int. Cl.
*B32B 38/10*    (2006.01)
*B32B 43/00*    (2006.01)

(52) U.S. Cl.
CPC ............ *B32B 43/006* (2013.01); *B32B 38/10* (2013.01); *B32B 2457/20* (2013.01);
(Continued)

(58) Field of Classification Search
CPC . B32B 38/10; B32B 43/006; Y10T 156/1944; Y10T 156/195; Y10T 156/1978; Y10T 156/1132; Y10T 156/1174
(Continued)

(56) References Cited

U.S. PATENT DOCUMENTS 6,258,666 B1 *  7/2001  Mizutani ................ C23C 16/01
                                                             156/241
9,289,970 B2    3/2016  Seo et al.
(Continued)

FOREIGN PATENT DOCUMENTS

CN    101264683 A      9/2008
CN    201170824        12/2008
(Continued)

OTHER PUBLICATIONS

First Office Action, including Search Report, for Chinese Patent Application No. 201510250995.1, dated May 30, 2015, 21 pages.
(Continued)

*Primary Examiner* — Mark A Osele
*Assistant Examiner* — Nickolas Harm
(74) *Attorney, Agent, or Firm* — Westman, Champlin & Koehler, P.A.

(57) ABSTRACT

The present disclosure discloses a film stripping device including: a fixing mechanism for fixing a substrate on which a film to be stripped is disposed; and a stripping mechanism comprising a striping member for stripping at least a part of an edge of the film and a gripping member for gripping the stripped part of the film and movable in a direction towards the film to be stripped relative to the fixing
(Continued)

mechanism. Correspondingly, a film stripping method using the film stripping device is also disclosed. The present disclosure increases the efficiency of film stripping and reduces an amount of used adhesive tapes.

20 Claims, 3 Drawing Sheets

(52) U.S. Cl.
CPC .... *Y10T 156/1132* (2015.01); *Y10T 156/1174* (2015.01); *Y10T 156/195* (2015.01); *Y10T 156/1944* (2015.01); *Y10T 156/1978* (2015.01)

(58) Field of Classification Search
USPC ........... 156/707, 715, 758, 759, 764, 924
See application file for complete search history.

(56) References Cited

U.S. PATENT DOCUMENTS

| | | | |
|---|---|---|---|
| 2007/0222274 | A1 | 9/2007 | Manners |
| 2008/0185100 | A1* | 8/2008 | Jang ...................... B32B 43/006 156/714 |
| 2008/0236743 | A1* | 10/2008 | Kye ................... B29C 63/0013 156/714 |
| 2008/0245483 | A1 | 10/2008 | Toyoshima et al. |
| 2013/0133839 | A1* | 5/2013 | Seo ....................... B32B 43/006 156/715 |
| 2015/0151531 | A1* | 6/2015 | Ohno .................... B32B 43/006 156/755 |
| 2015/0309341 | A1* | 10/2015 | Zhang .................. G02F 1/1303 445/2 |

FOREIGN PATENT DOCUMENTS

| | | |
|---|---|---|
| CN | 102092170 A | 6/2011 |
| CN | 102896876 A | 1/2013 |
| CN | 103129095 A | 6/2013 |
| CN | 104924733 | 9/2015 |
| JP | 1-163043 | 11/1989 |
| JP | 2008-186007 A | 8/2008 |

OTHER PUBLICATIONS

International Search Report and Written Opinion for International Application No. PCT/CN2015/093677, dated Feb. 1, 2016.
English translation of Box No. V from the Written Opinion of the International Searching Authority for International Application No. PCT/CN2015/093677, dated Feb. 1, 2016.
Second Office Action for Chinese Patent Application No. 201510250995.1, dated Dec. 12, 2016, 21 pages.

* cited by examiner

FILM STRIPPING DEVICE AND FILM STRIPPING METHOD

CROSS-REFERENCE TO RELATED APPLICATION

This application is a Section 371 National Stage Application of International Application No. PCT/CN2015/093677, filed on Nov. 3, 2015, entitled "FILM STRIPPING DEVICE AND FILM STRIPPING METHOD", which has not yet published, which claims priority to Chinese Application No. 201510250995.1, filed on May 15, 2015, incorporated herein by reference in their entirety.

BACKGROUND OF THE INVENTION

Field of the Invention

Embodiments of the present disclosure relate to a field for manufacturing a display device, specifically, to a film stripping device and a film stripping method.

Description of the Related Art

A display panel is typically provided with polaroids at two sides. In order to ensure degree of finish of the polaroid during it is manufactured, a protective film is attached onto a surface of the polaroid when the polaroid is shipped. Then, during the display panel is manufactured, it is required to separate the protective film attached onto the polaroid from the polaroid.

During stripping the protective film in the prior art, a manually or an adhesive tape stripping method is typically used. However, the manually stripping method has a low efficiency. In the adhesive tape stripping method, the adhesive tape is adhered onto the entire protective film in a lateral or oblique direction and then is moved so as to strip the protective film. A length of the adhesive tape consumed by stripping one protective film is equal to a length of the protective film itself, which leads to a large consumption amount of the adhesive tape.

SUMMARY OF THE INVENTION

The present disclosure aims to provide a film stripping device and a film stripping method using the film stripping device so as to increase the efficiency of film stripping while reducing the stripping cost.

In order to realize the above objectives, it is provided a film stripping device comprising:

a fixing mechanism for fixing a substrate on which a film to be stripped is disposed; and a stripping mechanism comprising a striping member for stripping at least a part of an edge of the film and a gripping member for gripping the stripped part of the film and movable in a direction towards the film to be stripped relative to the fixing mechanism.

Preferably, the stripping member comprises a stripping roller which comprises a spindle and a roller body rotatably disposed on the spindle, the roller body being provided with adhesive material on its surface so that the film is adhered to the surface of the roller body as the roller body rolls along the film.

Preferably, the film stripping device further comprises a first guide rail spaced apart from a fixing surface of the fixing mechanism, and the stripping mechanism is slidably disposed on the first guide rail.

Preferably, the gripping member comprises a gripping linear piston cylinder and a gripping head which comprises a first gripping head part and a second gripping head part disposed opposite to each other, the first gripping head part being disposed on a barrel of the gripping linear piston cylinder and the second gripping head part being disposed on a piston rod of the gripping linear piston cylinder.

Preferably, the stripping mechanism further comprises a lifting linear piston cylinder, and the spindle of the stripping roller is disposed on a piston rod of the lifting linear piston cylinder.

Preferably, the film stripping device further comprises a mounting platform on which both the barrel of the gripping linear piston cylinder and a barrel of the lifting linear piston cylinder are secured.

Preferably, the mounting platform comprises a connecting plate comprising a first connecting plate and a second connecting plate, the barrel of the gripping linear piston cylinder is disposed on a mounting surface of the first connecting plate and the barrel of the lifting linear piston cylinder is disposed on a mounting surface of the second connecting plate, and wherein the mounting surface of the first connecting plate is at a predetermined angle relative to the mounting surface of the second connecting plate.

Preferably, the film stripping device further comprises a sensor and a controller; and wherein the sensor is configured for detecting whether a part of the film is wound onto the roller body as the stripping mechanism has been moved by a preset distance along the first guide rail; when the sensor detects that a part of the film has been wound onto the roller body, the sensor sends a first detecting signal to the controller, and then the controller controls the first and second gripping head parts to move close to each other according to the first detecting signal so as to grip the film; when the sensor detects that no film has been wound onto the roller body, the sensor sends a second detecting signal to the controller, and then the controller controls the stripping roller to return to its initial position according to the second detecting signal; and/or wherein the sensor is further configured for detecting whether a part of the film is gripped between the first gripping head part and second gripping head part; when the sensor detects that a part of the film has been gripped between the first gripping head part and second gripping head part, the sensor sends a third detecting signal to the controller, and then the controller controls the gripping mechanism to move in a direction towards the film to be stripped according to the third detecting signal; when the sensor detects that no film has been gripped between the first gripping head part and second gripping head parts, the sensor sends a fourth detecting signal to the controller, and then the controller controls the first gripping head part and second gripping head part to move away from each other according to the fourth detecting signal.

Preferably, both the first gripping head part and second gripping head part are provided with air jet apertures on their opposite gripping surfaces; and wherein the film stripping device further comprises an air supply mechanism which is communicated with the air jet apertures.

Preferably, the film stripping device further comprises a second guide rail on which an end of the first guide rail is slidably disposed.

Preferably, the fixing mechanism is located above the stripping mechanism, a movement range of the first guide rail is formed into a parallelogram area as the first guide rail slides along the second guide rail, and an orthographic projection of the fixing mechanism towards the stripping mechanism is located within the parallelogram region.

Preferably, an extension direction of the first guide rail is perpendicular to that of the second guide rail.

Preferably, the film stripping device further comprises a recovery mechanism for recovering the stripped film.

Preferably, the stripping mechanism further comprises a rotary piston cylinder, which includes a barrel slidably disposed on the first guide rail, a piston rod and a rotary shaft connected with the piston rod, such that a linear movement of the piston rod is converted into a rotary movement of the rotary shaft; and wherein the rotary shaft of the rotary piston cylinder is connected with the barrel of the gripping linear piston cylinder so as to rotate the first gripping head part and second gripping head part to an inlet of the recovery mechanism.

Preferably, the fixing mechanism comprises an absorbing platform located above the stripping mechanism, and the absorbing platform is provided with absorbing apertures on its absorbing surface such that the absorbing surface is formed as the fixing surface.

Preferably, the absorbing platform is further provided with a buffering material layer on the absorbing surface, and the absorbing apertures extend through the buffering material layer in a thickness direction of the buffering material layer.

Correspondingly, it is further provided a film stripping method by using any one of the above film stripping devices, the method comprising:

step S10: fixing the substrate provided with a film to be stripped on the fixing mechanism;

step S20: stripping a part of an edge of the film from the substrate by using the stripping member of the stripping mechanism;

step S30: gripping the stripped part of the film by the gripping member;

step S40: controlling the stripping mechanism to move in a direction towards the film to be stripped relative to the fixing mechanism.

Preferably, the stripping member comprises a stripping roller comprising a spindle and a roller body rotatably disposed on the spindle, the roller body being provided with adhesive material on its surface; and wherein the film stripping device further comprises a first guide rail spaced apart from a fixing surface of the fixing mechanism, the stripping mechanism being slidably disposed on the first guide rail; and wherein the step S20 comprises:

step S20a: adhering an edge of the film by the roller body;

step S20b: controlling the stripping mechanism to move by a preset distance along the first guide rail to adhere a part of the film to the surface of the roller body.

Preferably, the film stripping device further comprises a mounting platform, and the stripping mechanism further comprises a lifting linear piston cylinder, the spindle of the stripping roller being disposed on a piston rod of the lifting linear piston cylinder, and a barrel of the lifting linear piston cylinder being secured on the mounting platform; and wherein the film stripping method further comprises the following step between the steps S30 and S40:

step S35: retracting the piston rod of the lifting linear piston cylinder back into the barrel so as to bring the stripping roller to move away from the fixing mechanism.

Preferably, the gripping member comprises a gripping linear piston cylinder and a gripping head comprising a first gripping head part and a second gripping head part disposed opposite to each other, the first gripping head part being disposed on a barrel of the gripping linear piston cylinder and the second gripping head part being disposed on a piston rod of the gripping linear piston cylinder; and wherein the film stripping device further comprises a sensor and a controller; and wherein the film stripping method further comprises the following step between the steps S20 and S30:

step S21: detecting whether a part of the film is wound onto the roller body by the sensor; controlling the stripping roller to return to its initial position by the controller and performing the step S20 again when no film has been detected on the roller body; performing the step S30 when a part of the film has been detected to be wound onto the roller body; and/or wherein the film stripping method further comprises the following step between the steps S30 and S35:

step S31: detecting whether a part of the film is gripped between the first gripping head part and second gripping head part by the sensor; performing the step S35 when a part of the film has been detected to be gripped between the first and second gripping head parts; performing the step S30 again when no film has been detected to be gripped between the first gripping head part and second gripping head part.

Preferably, the film stripping device further comprises a second guide rail on which an end of the first guide rail is slidably disposed, the fixing mechanism is located above the stripping mechanism, a movement range of the first guide rail is formed into a parallelogram region as the first guide rail slides along the second guide rail, and an orthographic projection of the fixing mechanism towards the stripping mechanism is located within the parallelogram region, and wherein a corner of the film is adhered to the roller body in the step S20a, and the step S20 further comprises the following step which is performed at the same moment of the step S20b:

step S20c: controlling the first guide rail to move by the preset distance along the second guide rail, and wherein the step S40 comprises: controlling the stripping mechanism to move along the first guide rail while controlling the first guide rail to move along the second guide rail.

Preferably, the film stripping method further comprises the following step which is performed after step S40:

step S50: controlling the first gripping head part and second gripping head part to move away from each other.

Preferably, both the first gripping head part and second gripping head part are provided with air jet apertures on their opposite gripping surfaces, and the film stripping device further comprises an air supply mechanism which is communicated with the air jet apertures, and wherein the film stripping method further comprises the following step which is performed after step S50:

step S60: ejecting air into the air jet apertures by using the air supply mechanism.

Preferably, the film stripping device further comprises a rotary piston cylinder and a recovery mechanism, and wherein the film stripping method further comprises the following step which is performed between the steps S40 and S50:

step S41: controlling a rotary shaft of the rotary piston cylinder to rotate so as to rotate the first gripping head part and second gripping head part to an inlet of the recovery mechanism.

During stripping the film from the substrate by using the film stripping device according to embodiments of the present disclosure, a part of an edge of the film is stripped by the stripping member. After the part of the film is stripped off, the gripping member may grip the stripped part of the film and move relative to the fixing mechanism, so that the entire film is stripped off from the substrate, thereby increasing the efficiency of film stripping and reducing cost as excessive adhesive tapes are not required.

BRIEF DESCRIPTION OF THE DRAWINGS

The accompanying drawings are included to provide a further understanding of the present disclosure, and constitute a part of this specification. The drawings together with the following detailed embodiments serve to explain the present disclosure, but are not intended to limit the present invention. In the drawings.

LIST OF REFERENCE NUMERALS

10: fixing mechanism; 11: absorbing platform; 12: absorbing aperture; 13: buffering material layer; 20: stripping mechanism; 21: stripping roller; 22: gripping member; 22a: gripping linear piston cylinder; 22b: gripping head; 221b: first gripping head part; 222b: second gripping head part; 23: lifting linear piston cylinder; 24: connecting plate; 31: first guide rail; 32: first motor; 41: second guide rail; 42: second motor; 30: recovery mechanism; 51: rotary piston cylinder; 60: substrate.

DETAILED DESCRIPTION OF PREFERRED EMBODIMENTS OF THE INVENTION

The following specific embodiments of the present disclosure will be described in detail with reference to the accompanying drawings. It should be understood that the specific embodiments described herein are only intended to illustrate and explain the present disclosure and are not intended to limit the present invention.

Figure 1:
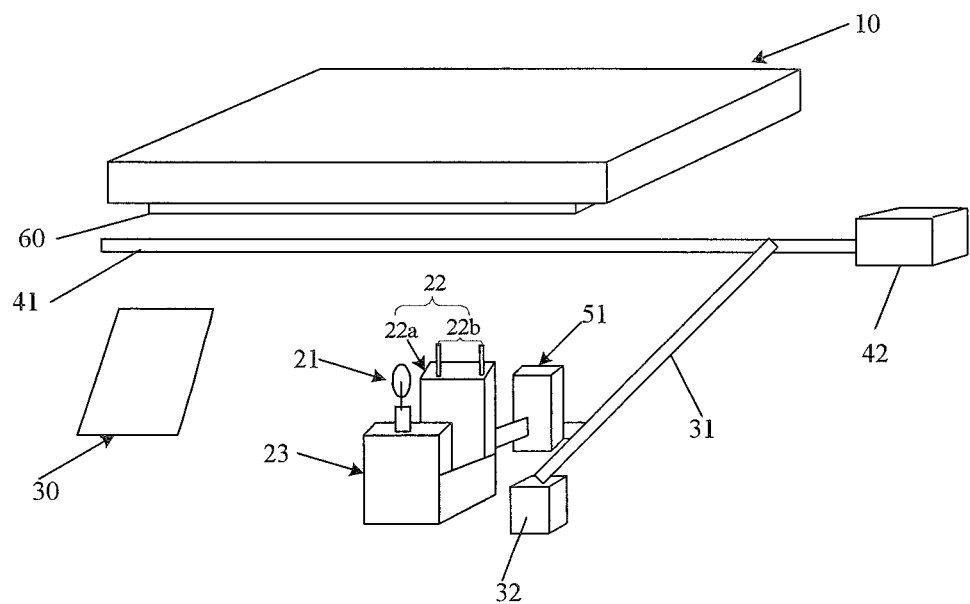
FIG. 1 is a schematic structural perspective view of a film stripping device according to an embodiment of the present disclosure.
Figure 2:
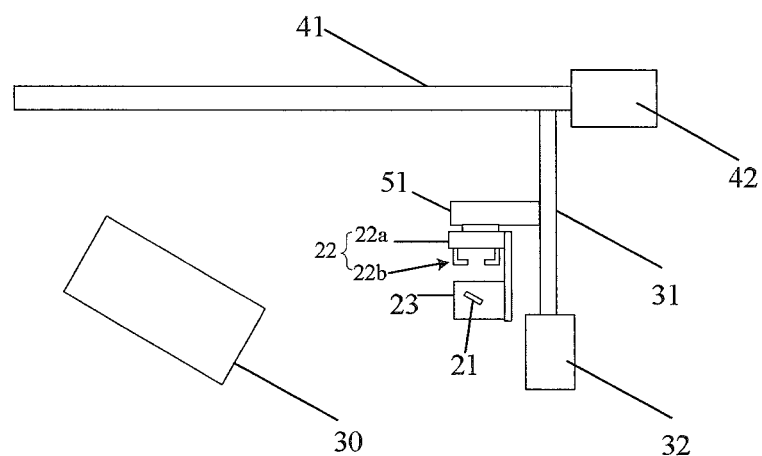
FIG. 2 is a schematic top view of the film stripping device according to an embodiment of the present disclosure.
Figure 3:
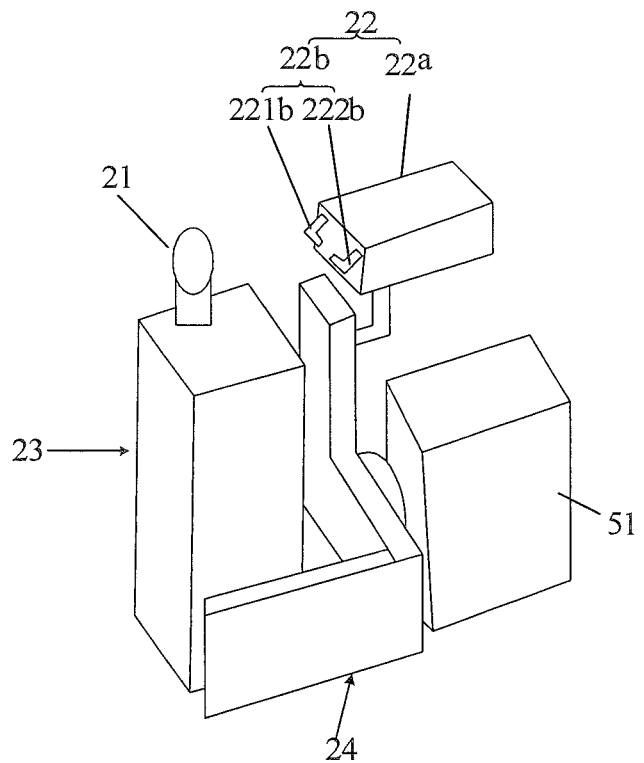
FIG. 3 is a schematic structural view of a stripping mechanism according to an embodiment of the present disclosure.

According to an aspect of the present disclosure, a film stripping device is provided. As shown in FIGS. 1-3, the film stripping device comprises: a fixing mechanism 10 for fixing a substrate on which a film to be stripped is disposed; and a stripping mechanism 20 comprising a striping member for stripping at least a part of an edge of the film and a gripping member 22 for gripping the stripped part of the film and movable in a direction towards the film to be stripped relative to the fixing mechanism 10.

During stripping the film from the substrate, a part of an edge of the film is stripped by the stripping member. After the part of the film is stripped off, the gripping member may grip the stripped part of the film and move relative to the fixing mechanism, so that the entire film is stripped off from the substrate, thereby increasing the efficiency of film stripping and reducing cost as excessive adhesive tapes are not required.

The stripping member may start the stripping from a corner of the film in order to facilitate stripping. In the film stripping device, the fixing mechanism 10 may be stationary while the stripping mechanism 20 may be moved in a direction towards the film center. Alternatively, the stripping mechanism 20 may be stationary while a center of the fixing mechanism 10 may be moved towards the stripping mechanism.

As a specific implementation of the present disclosure, as shown in FIGS. 2 and 3, the stripping member comprises a stripping roller 21. The stripping roller 21 comprises a spindle and a roller body rotatably disposed on the spindle. The roller body is provided with adhesive material such as double-sided tape on its surface so that the film will be adhered onto the surface of the roller body as the roller body rolls along the film. The film stripping device further comprises a first guide rail 31 spaced apart from the fixing mechanism. The stripping mechanism 20 is slidably disposed on the first guide rail 31. The film stripping device may further comprise a first motor 32. The stripping mechanism 20 is brought by the first motor 32 to move along the first guide rail 31. If the film edge is adhered onto the surface of the roller body and the stripping mechanism 20 is moved towards the center of the substrate along the first guide rail 31, the roller body rolls along the surface of the film so that a part of the film may be wound onto the roller body so as to be separated from the substrate, so as to initiate the stripping.

It should be understood that an adhesive force between the film and the adhesive material should be larger than an adhesive force between the film and the substrate. The film stripping device is particularly suitable for stripping the protective film from the polaroid. In order to facilitate stripping the film, the substrate may be placed on the fixing mechanism in such a position that the diagonal line of the substrate is parallel with the first guide rail if the film stripping device comprises the first guide rail, so that the film may be stripped along the diagonal line of the substrate.

Specifically, the gripping member 22 comprises a gripping linear piston cylinder 22a and a gripping head 22b, as shown in FIGS. 2 and 3. The gripping head comprises a first gripping head part 221b and a second gripping head part 222b disposed opposite to each other. The first gripping head part 221b is disposed on a barrel of the gripping linear piston cylinder 22a while the second gripping head part 222b is disposed on a piston rod of the gripping linear piston cylinder 22a. The barrel of the gripping linear piston cylinder 22a is fixed on a mounting platform so that the first gripping head part 221b is kept stationary relative to the mounting platform. As the piston rod of the gripping linear piston cylinder 22a is moved back and forth, the first gripping head part 221b and the second gripping head part 222b may be brought to be close to or away from each other so as to grip or release the film.

It should be understood that the gripping head 22b is in an expanded state (that is, the first and second gripping head parts are spaced apart from each other) when the part of the film is wound onto the surface of the roller body as the roller body rolls along the film. A position relationship between the gripping head 22b and the stripping roller 21 may be configured such that an edge of the part of the film wound onto the roller body may extend into a position between the expanded first and second gripping head parts 221b, 222b when the part of the film is wound onto the roller body. As a result, the film may be gripped by the gripping head, and the gripping head may be moved until the entire firm is separated from the substrate while the stripping mechanism is moved along the first guide rail.

Further, the film stripping device may also comprise a mounting platform on which the barrel of the gripping linear piston cylinder is fixed.

As shown in FIG. 3, the stripping mechanism 20 may also comprise a lifting linear piston cylinder 23. The spindle of the stripping roller 21 is disposed on a piston rod of the lifting linear piston cylinder 23, and the lifting linear piston cylinder 23 is disposed on the mounting platform. If the stripping roller starts the stripping, the piston rod of the lifting linear piston cylinder 23 may be pushed towards the exterior of its barrel so as to bring the stripping roller close to the substrate. If the film is gripped by the gripping member 22, the piston rod of the lifting linear piston cylinder 23 may be retracted back into the barrel to bring the stripping roller 21 away from the substrate so as to facilitate the movement of the gripping member 22.

The spindle of the stripping roller 21 may be removably disposed on the lifting linear piston cylinder 23 so that the stripping roller 21 is easy to be removed for replacement if the adhesive force of the adhesive material on the stripping roller 21 becomes low.

Specifically, as shown in FIG. 3, the mounting platform comprises a connecting plate 24 comprising a first connecting plate and a second connecting plate. The barrel of the gripping linear piston cylinder 22a is disposed on a mounting surface of the first connecting plate and the barrel of the lifting linear piston cylinder 23 is disposed on a mounting surface of the second connecting plate. The mounting surface of the first connecting plate is at a predetermined angle relative to the mounting surface of the second connecting plate, for example, the two mounting surfaces are perpendicular to each other, so as to facilitate arranging the gripping head 22b in a position corresponding to the stripping roller and enabling the part of the film wound onto the roller body to extend into a position between the first and second gripping head parts 221b, 222b.

Further, the film stripping device also comprises a sensor and a controller (not shown). The sensor is configured for detecting whether a part of the film is wound onto the roller body as the stripping mechanism is moved by a preset distance along the first guide rail 31. If the sensor detects that a part of the film has been wound onto the roller body, the sensor may send a first detecting signal to the controller, then the controller will control the first and second gripping head parts 221b, 222b to move close to each other according to the first detecting signal so as to grip the film on the roller body. If the sensor detects that no film has been wound onto the roller body, the sensor may send a second detecting signal to the controller, then the controller will control the stripping roller to return to its initial position according to the second detecting signal. Additionally or alternatively, the sensor may be configured for detecting whether a part of the film is gripped between the first and second gripping head parts. If the sensor detects that a part of the film has been gripped between the first and second gripping head parts, the sensor may send a third detecting signal to the controller, then the controller will control the gripping mechanism 20 to move in a direction towards the film to be stripped (that is, to move in a direction away from the stripped part of the film or to move in a direction away from a part of the substrate corresponding to the stripped part of the film) and control the stripping roller to move away from the substrate according to the third detecting signal. If the sensor detects that no film has been gripped between the first and second gripping head parts 221b, 222b, the sensor may send a fourth detecting signal to the controller, then the controller will control the first and second gripping head parts 221b, 222b to move away from each other according to the fourth detecting signal so as to perform the next gripping operation. In other words, the sensor and the controller may be configured such that the gripping member will grip a part of the film wound onto the roller body only if the part of the film has been wound onto the roller body of the stripping roller 21, so that a gripping success rate of the gripping member can be ensured and an automatic film stripping may be realized.

The gripping linear piston cylinder 22a and the lifting linear piston cylinder 23 in the embodiment may be an air cylinder or a hydraulic cylinder. The gripping linear piston cylinder includes a rod end chamber and a rodless chamber which are communicated with a common fluid source. Similarly, the lifting linear piston cylinder also includes a rod end chamber and a no-rod end chamber which are communicated with a common fluid source.

Specifically, the gripping linear piston cylinder 22a may be provided with first solenoid valves at both a fluid inlet of the rodless chamber and a fluid inlet of the rod end chamber. The lifting linear piston cylinder may be provided with second solenoid valves at both a fluid inlet of the rodless chamber and a fluid inlet of the rod end chamber. Both control ends of the first and second solenoid valves may be connected to the controller.

If the controller receives the first detecting signal, the controller will send a first control signal to the first solenoid valve to enable fluid to flow into the rod end chamber and flow out of the rodless chamber, that is, to enable the piston rod of the gripping linear piston cylinder 22a to retract back into its barrel, so that the piston rod of the gripping linear piston cylinder will bring the second gripping head part 222b to move close to the first gripping head part 221b. If the controller receives the second detecting signal, the controller will send a second control signal to the first motor to enable the first motor to move the stripping mechanism 20 so as to bring the stripping roller to return to its initial position. Similarly, if the controller receives the third detecting signal, the controller will send a third control signal to the second solenoid valve to enable fluid to flow into the rod end chamber and flow out of the rodless chamber, that is, to enable the piston rod of the lifting linear piston cylinder 23 to retract back into its barrel, so that the stripping roller will be brought away from the substrate and striping mechanism 20 will be moved by the first motor so as to separate the entire film from the substrate. If the controller receives the fourth detecting signal, the controller will send a fourth control signal to the first solenoid valve to enable fluid to flow into the rodless chamber of the gripping linear piston cylinder 22a and flow out of the rod end chamber thereof, so that the piston rod of the gripping linear piston cylinder 22a is pushed towards the exterior of its barrel to bring the second gripping head part 222b to move away from the first gripping head part 221b.

Further, both the first and second gripping head parts 221b, 222b are provided with air jet apertures on their opposite gripping surfaces. The film stripping device further comprises an air supply mechanism which is communicated with the air jet apertures. Specifically, the air jet apertures may be communicated with the air supply mechanism via air conduits. When the gripping head 22b has stripped the entire film, the air supply mechanism ejects air through the air jet apertures to prevent the film from being absorbed onto the gripping head 22b due to static electricity generated during the stripping, which facilitates the separation of the film.

Further, as shown in FIGS. 1 and 2, the film stripping device may also comprise a second guide rail 41 on which an end of the first guide rail 31 is slidably disposed. When the stripping mechanism 20 is moved along the first guide rail 31 while the first guide rail 31 is moved along the second guide rail 41, the movement trace of the stripping mechanism 20 may be changed by adjusting the movement speed of the stripping mechanism 20 and the movement speed of the first guide rail 31, so that the film can be stripped in different directions, thereby increasing the flexibility of the film stripping.

The fixing mechanism 10 may be located above the stripping mechanism 20 or alternatively below the stripping mechanism 20. In the present embodiment, the fixing mechanism 10 is located above the stripping mechanism 20, the movement range of the first guide rail 31 is formed into a parallelogram region as the first guide rail 31 slides along the second guide rail, and an orthographic projection of the fixing mechanism 10 towards the stripping mechanism 20 is located within the parallelogram region.

At initial moment of the stripping, the substrate is fixed on the fixing mechanism 10 and the stripping mechanism may correspond to a corner of the film on the substrate. Also, a second motor 42 may be provided to move the first guide rail 31 along the second guide rail 41. As a result, the movement trace of the stripping mechanism 20 may be changed by adjusting the movement speed of the stripping mechanism 20 along the first guide rail 31 and the movement speed of the first guide rail 31 along the second guide rail 41.

Preferably, an extension direction of the first guide rail 31 is perpendicular to that of the second guide rail 41. When fixing the substrate, the substrate 60 may be fixed in such a position that the length direction of the substrate 60 is parallel with the first guide rail 31, the width direction of the substrate 60 is parallel with the second guide rail 41 and the corners of the substrate 60 correspond to the position of the stripping roller. When stripping from the substrate 60, the first motor 32 and the second motor 42 are driven with the same speed to bring the stripping mechanism to perform the stripping in a diagonal direction of the film so as to facilitate stripping the film.

Further, as shown in FIGS. 1 and 2, the film stripping device also comprises a recovery mechanism 30, such as recovery bin and the like, for recovering the stripped film, so as to facilitate collecting and reusing the film.

In order to enable the stripped film to fall into the recovery mechanism 30 correctly, the stripping mechanism further comprises a rotary piston cylinder 51 as shown in FIG. 1. A barrel of the rotary piston cylinder 51 is slidably disposed on the first guide rail 31 and a piston rod of the rotary piston cylinder 51 is connected with a rotary shaft. A linear movement of the piston rod of the rotary piston cylinder 51 can be converted into a rotary movement of the rotary shaft. The rotary shaft of the rotary piston cylinder 51 is connected with the barrel of the gripping linear piston cylinder 22a so as to rotate the first and second gripping head parts 221b, 222b to an inlet of the recovery mechanism 30, enabling the stripped film to fall into the recovery mechanism 30 correctly. As stated above, both the barrels of the gripping linear piston cylinder 22a and the lifting linear piston cylinder 23 are disposed on the connecting plate, and the connecting plate may be connected with the rotary shaft of the rotary piston cylinder 51. As the rotary piston cylinder 51 slides along the first guide rail, it may bring the gripping linear piston cylinder 22a and the lifting linear piston cylinder 23 to move simultaneously. When the entire film has been stripped off, the rotary shaft of the rotary piston cylinder 51 is rotated to bring the gripping linear piston cylinder 22a and the lifting linear piston cylinder 23 to rotate simultaneously until the first and second gripping head parts 221b, 222b are rotated to the inlet of the recovery mechanism 30. Then the first and second gripping head parts 221b, 222b are moved away from each other to enable the film to fall into the recovery mechanism.

Figure 4:
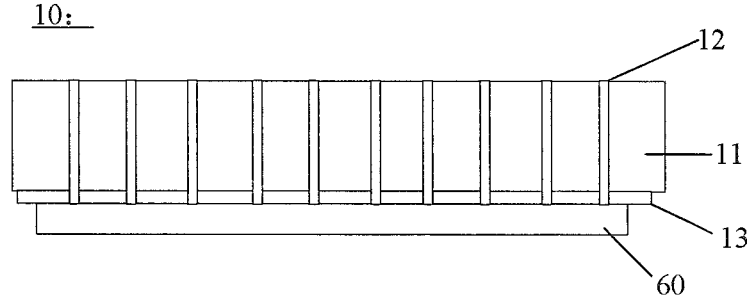
FIG. 4 is a schematic structural view of a fixing mechanism according to an embodiment of the present disclosure.

The fixing mechanism 10 in the embodiment may be in various forms. Specifically, as shown in FIG. 4, the fixing mechanism 10 comprises an absorbing platform 11 fixed on a mounting base of the film stripping device. The absorbing platform 11 is located above the stripping mechanism 20, and is provided with absorbing apertures 12 on its absorbing surface which is formed into the fixing surface. The absorbing apertures 12 may be communicated with an external extraction device by which air is extracted to fix the substrate 60.

Further, the absorbing platform 11 may also be provided with a buffering material layer 13 such as rubber and the like on its absorbing surface. The absorbing apertures 12 penetrate through the buffering material layer 13 in a thickness direction of the buffering material layer 13. The arrangement of the buffering material layer 13 may reduce the damage of the substrate due to the absorbing platform.

As stated above, the film stripping device according to the embodiments of the present disclosure is particularly suitable for stripping the protective film from the polaroid. The substrate on which the polaroid is disposed is typically provided with a driving circuit. In a case of fixing the substrate by using the fixing mechanism, a side of the substrate provided with the driving circuit may be disposed adjacent to the stripping mechanism, that is, the stripping mechanism may start the stripping at the side of the driving circuit, so as to prevent excessive static electricity from accumulating onto the driving circuit, thereby reducing electrostatic breakdown which may occur in the driving circuit.

Figure 5:
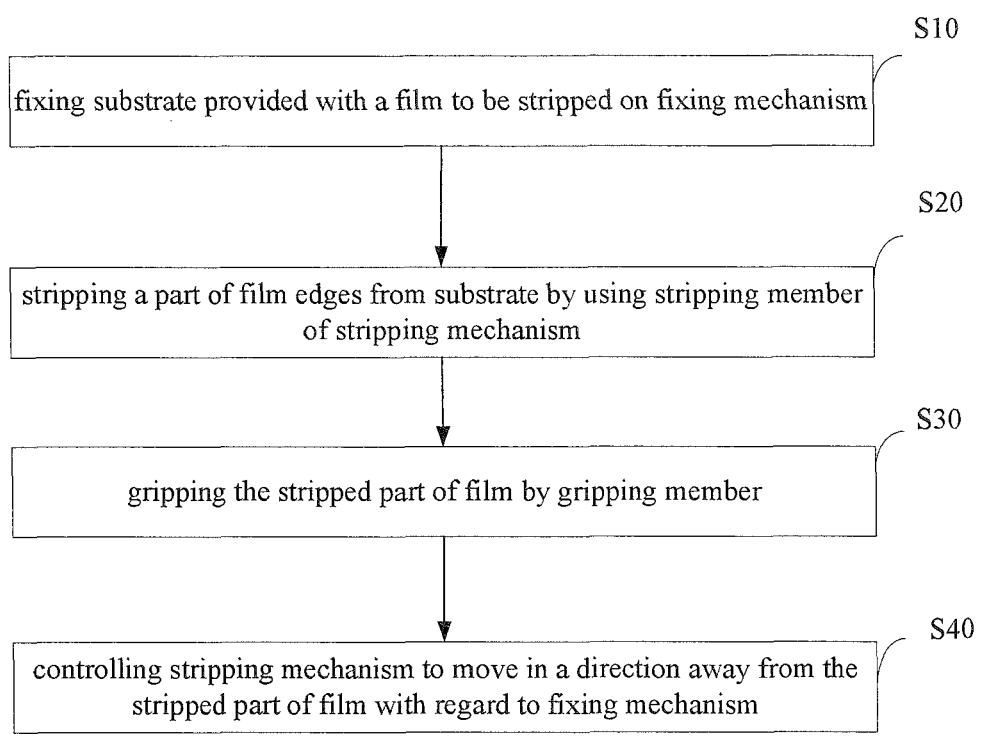
FIG. 5 is a flow chart of a film stripping method according to an embodiment of the present disclosure.

According to another aspect of the present disclosure, as shown in FIG. 5, a film stripping method by using the above film stripping device is provided, the method comprising:

step S10: fixing a substrate provided with a film to be stripped on a fixing mechanism;

step S20: stripping a part of an edge of the film from the substrate by using a stripping member of a stripping mechanism;

step S30: gripping the stripped part of the film by a gripping member;

step S40: controlling the stripping mechanism to move in a direction towards the film to be stripped relative to the fixing mechanism.

As stated above, the stripping member comprises a stripping roller. The stripping roller comprises a spindle and a roller body rotatably disposed on the spindle. The roller body is provided with adhesive material on its surface. The film stripping device further comprises a first guide rail spaced apart from a fixing surface of the fixing mechanism. The stripping mechanism is slidably disposed on the first guide rail. The step S20 may comprise:

step S20a: adhering an edge of the film by the stripping roller;

step S20b: controlling the stripping mechanism to move by a preset distance along the first guide rail to adhere a part of the film onto the surface of the roller body, that is, to strip a part of the film from the substrate, so as to initiate the stripping.

The stripping roller in the embodiment may only be used to initiate the stripping, and it may not be used when the film is gripped by the gripping member. Specifically, the film stripping device may also comprise a mounting platform, and the stripping mechanism may also comprise a lifting linear piston cylinder. The spindle of the stripping roller is disposed on a piston rod of the lifting linear piston cylinder, and a barrel of the lifting linear piston cylinder is secured on the mounting platform. The film stripping method may also comprise the following step between the steps S30 and S40:

step S35: controlling the piston rod of the lifting linear piston cylinder to retract back into its barrel so as to bring the stripping roller to move away from the fixing mechanism, so that a part of the film adhered onto the stripping roller may be separated from the stripping roller when the film is gripped by the gripping member, so as to strip the entire film from the substrate by the gripping member.

Further, the gripping member comprises a gripping linear piston cylinder and a gripping head. The gripping head comprises a first gripping head part and a second gripping head part disposed opposite to each other. The first gripping head part is disposed on a barrel of the gripping linear piston cylinder while the second gripping head part is disposed on a piston rod of the gripping linear piston cylinder. The film stripping device may also comprise a sensor and a controller. The film stripping method may also comprise the following step between the steps S20 and S30:

step S21: detecting whether a part of the film is wound onto the roller body by the sensor; controlling the stripping roller to return to its initial position by the controller and performing the step S20 again if no film has been detected to be wound onto the roller body; performing the step S30 if a part of the film has been detected to be wound onto the roller body; and/or the stripping method may also comprise the following step between the steps S30 and S35:

step S31: detecting whether a part of the film is gripped between the first and second gripping head parts by the sensor; performing the step S35 if a part of the film has been detected to be gripped between the first and second gripping head parts; performing the step S30 if no film has been detected to be gripped between the first and second gripping head parts.

The film stripping device further comprises a first motor for drive the stripping mechanism to move along the first guide rail. The first motor may be connected with the controller. If no film has been wound onto the stripping roller, the stripping mechanism is brought to return to its initial position by the first motor under control of the controller so as to bring the stripping roller to return to its initial position and move along the first guide rail again until a part of the film is wound onto the stripping roller. The gripping linear piston cylinder may be provided with first solenoid valves at both a fluid inlet of the rodless chamber and a fluid inlet of the rod end chamber. The first solenoid valves may be connected with the controller. If a part of the film has been wound onto the stripping roller, the controller sends a signal to the first solenoid valves so as to allow both the rod end chamber and the rodless chamber of the gripping linear piston cylinder to communicate with a fluid source and thus to enable fluid to flow into the rod end chamber and flow out of the rodless chamber, so that the first and second gripping head parts can be moved close to each other to grip the film on the gripping roller. Only if the film is gripped between the first and second gripping head parts, the lifting linear piston cylinder is allowed to bring the stripping roller to move away from the substrate and to move the stripping mechanism, so that a success rate of stripping the film can be ensured.

Further, the film stripping device may also comprise a second guide rail on which an end of the first guide rail is slidably disposed. The fixing mechanism is located above the stripping mechanism, the movement range of the first guide rail is formed into a parallelogram region as the first guide rail slides along the second guide rail, and an orthographic projection of the fixing mechanism towards the stripping mechanism is located within the parallelogram region.

In the step S20a, a corner of the film is adhered to the roller body.

The step S20 may also comprise the following step which is performed at the moment of the step S20b:

step S20c: controlling the first guide rail to move by the preset distance along the second guide rail.

The step S40 specifically comprises: controlling the stripping mechanism to move along the first guide rail while controlling the first guide rail to move along the second guide rail, wherein the stripping mechanism and the first guide rail can be moved at the same speed so that a movement trace of the stripping mechanism is an angular bisector along the corner of the film to facilitate stripping the film.

Further, the film stripping method may also comprise the following step which is performed after the step S40:

step S50: controlling the first and second gripping head parts to move away from each other to release the stripped film. Specifically, fluid from the fluid source flows into the rodless chamber of the gripping linear piston cylinder and fluid from the rod end chamber of the gripping linear piston cylinder flows out, so that the piston rod of the gripping linear piston cylinder is retracted back into its barrel to bring the first and second gripping head parts to move away from each other.

Further, both the first and second gripping head parts are provided with air jet apertures on their opposite gripping surfaces. The film stripping device further comprises an air supply mechanism which is communicated with the air jet apertures. The film stripping method may also comprise the following step which is performed after the step S50:

step S60: ejecting air into the air jet apertures by using the air supply mechanism so that the film may be separated smoothly after the gripping head is released.

Further, the film stripping device may also comprise a rotary piston cylinder and a recovery mechanism. The film stripping method may also comprise the following step which is performed between the steps S40 and S50:

step S41: controlling a rotary shaft of the rotary piston cylinder to rotate so as to rotate the first and second gripping head parts to an inlet of the recovery mechanism, so that the stripped film may fall into the recovery mechanism to facilitate collecting the film.

In the embodiments of the present disclosure, during the film is stripped by the film stripping device, the stripping member is used to strip a part of an edge of the film, and the stripping manner may be an adhesive manner with adhesive material, then the gripping member is used to grip the stripped part of the film, and the entire film can be stripped from the substrate by moving the gripping member, thereby increasing the efficiency of film stripping and reducing cost as excessive adhesive tapes are not required.

It will be appreciated that the above embodiments are merely exemplary embodiments to illustrate the principle of the present invention, however, the present invention is not limited thereto. Those skilled in the art may make various modifications and improvements without departing from the spirit and substance of the present invention, and such variations and modifications are also considered as the scope of the present invention.

What is claimed is:

1. A film stripping device comprising:
   a fixing mechanism for fixing a substrate on which a film to be stripped is disposed; and
   a stripping mechanism comprising a stripping member for stripping at least a part of an edge of the film and a gripping member for gripping the part, stripped by stripping member, of the edge of the film and movable relative to the fixing mechanism so that the film is stripped from the substrate,
   wherein the stripping member comprises a stripping roller which comprises a spindle and a roller body rotatably disposed on the spindle, the roller body being provided with adhesive material on its surface so that the film is adhered to the surface of the roller body as the roller body rolls along the film,
   wherein the film stripping device further comprises a first guide rail spaced apart from a fixing surface of the fixing mechanism, and the stripping mechanism is slidably disposed on the first guide rail,
   wherein the gripping member comprises a gripping linear piston cylinder and a gripping head which comprises a first gripping head part and a second gripping head part disposed opposite to each other, the first gripping head part being disposed on a barrel of the gripping linear piston cylinder and the second gripping head part being disposed on a first piston rod of the gripping linear piston cylinder,
   wherein the stripping mechanism further comprises a lifting linear piston cylinder, and the spindle of the stripping roller is disposed on a second piston rod of the lifting linear piston cylinder.

2. The film stripping device according to claim 1, wherein the film stripping device further comprises a mounting platform on which both the barrel of the gripping linear piston cylinder and a barrel of the lifting linear piston cylinder are secured.

3. The film stripping device according to claim 2, wherein the mounting platform comprises a connecting plate comprising a first connecting plate and a second connecting plate, the barrel of the gripping linear piston cylinder is disposed on a mounting surface of the first connecting plate and the barrel of the lifting linear piston cylinder is disposed on a mounting surface of the second connecting plate, and wherein the mounting surface of the first connecting plate is at a predetermined angle relative to the mounting surface of the second connecting plate.

4. The film stripping device according to claim 1, further comprising a sensor and a controller, wherein
   the sensor is configured for detecting whether a part of the film is wound onto the roller body as the stripping mechanism has been moved by a preset distance along the first guide rail; when the sensor detects that a part of the film has been wound onto the roller body, the sensor sends a first detecting signal to the controller, and then the controller controls the first and second gripping head parts to move close to each other according to the first detecting signal so as to grip the film; when the sensor detects that no film has been wound onto the roller body, the sensor sends a second detecting signal to the controller, and then the controller controls the stripping roller to return to its initial position according to the second detecting signal; and/or
   the sensor is further configured for detecting whether a part of the film is gripped between the first gripping head part and second gripping head part; when the sensor detects that a part of the film has been gripped between the first gripping head part and second gripping head part, the sensor sends a third detecting signal to the controller, and then according to the third detecting signal, the controller controls the gripping mechanism to move so that the film is stripped from the substrate; when the sensor detects that no film has been gripped between the first gripping head part and second gripping head parts, the sensor sends a fourth detecting signal to the controller, and then the controller controls the first gripping head part and second gripping head part to move away from each other according to the fourth detecting signal.

5. The film stripping device according to claim 1, wherein the film stripping device further comprises a second guide rail on which an end of the first guide rail is slidably disposed.

6. The film stripping device according to claim 5, wherein the fixing mechanism is located above the stripping mechanism, a movement range of the first guide rail is formed into a parallelogram area as the first guide rail slides along the second guide rail, and an orthographic projection of the fixing mechanism towards the stripping mechanism is located within the parallelogram area.

7. The film stripping device according to claim 1, wherein the film stripping device further comprises a recovery mechanism for recovering the stripped film; and
   wherein the stripping mechanism further comprises a rotary piston cylinder, which includes:
   a barrel slidably disposed on the first guide rail;
   a third piston rod; and
   a rotary shaft connected with the third piston rod of the rotary piston cylinder,
   wherein a linear movement of the third piston rod of the rotary piston cylinder is converted into a rotary movement of the rotary shaft; and wherein the rotary shaft of the rotary piston cylinder is connected with the barrel of the gripping linear piston cylinder so as to rotate the first gripping head part and second gripping head part to an inlet of the recovery mechanism.

8. The film stripping device according to claim 1, wherein the fixing mechanism comprises an absorbing platform located above the stripping mechanism, and the absorbing platform is provided with absorbing apertures on its absorbing surface such that the absorbing surface is formed as the fixing surface,
   wherein the absorbing platform is further provided with a buffering material layer on the absorbing surface, and the absorbing apertures extend through the buffering material layer in a thickness direction of the buffering material layer.

9. A film stripping method by using the film stripping device of claim 1, the method comprising:
   step S10: fixing the substrate provided with a film to be stripped on the fixing mechanism;
   step S20: stripping a part of an edge of the film from the substrate by using the stripping member of the stripping mechanism;
   step S30: gripping the stripped part of the film by the gripping member;
   step S40: controlling the stripping mechanism to move relative to the fixing mechanism so that the film is stripped from the substrate.

10. The film stripping method according to claim 9, wherein the stripping member comprises a stripping roller comprising a spindle and a roller body rotatably disposed on the spindle, the roller body being provided with adhesive material on its surface; and wherein the film stripping device further comprises a first guide rail spaced apart from a fixing surface of the fixing mechanism, the stripping mechanism being slidably disposed on the first guide rail; and wherein the step S20 comprises:

step S20a: adhering an edge of the film by the roller body;

step S20b: controlling the stripping mechanism to move by a preset distance along the first guide rail to adhere a part of the film to the surface of the roller body.

11. The film stripping method according to claim 10, wherein the film stripping device further comprises a mounting platform, and the stripping mechanism further comprises a lifting linear piston cylinder, the spindle of the stripping roller being disposed on a piston rod of the lifting linear piston cylinder, and a barrel of the lifting linear piston cylinder being secured on the mounting platform; and wherein the film stripping method further comprises the following step between the steps S30 and S40:

step S35: retracting the piston rod of the lifting linear piston cylinder back into the barrel so as to bring the stripping roller to move away from the fixing mechanism.

12. The film stripping method according to claim 11, wherein the gripping member comprises a gripping linear piston cylinder and a gripping head comprising a first gripping head part and a second gripping head part disposed opposite to each other, the first gripping head part being disposed on a barrel of the gripping linear piston cylinder and the second gripping head part being disposed on a piston rod of the gripping linear piston cylinder; and wherein the film stripping device further comprises a sensor and a controller, and wherein the film stripping method further comprises the following step between the steps S20 and S30:

step S21: detecting whether a part of the film is wound onto the roller body by the sensor controlling the stripping roller to return to its initial position by the controller and performing the step S20 again when no film has been detected on the roller body; performing the step S30 when a part of the film has been detected to be wound onto the roller body; and/or wherein the film stripping method further comprises the following step between the steps S30 and S35:

step S31: detecting whether a part of the film is gripped between the first gripping head part and second gripping head part by the sensor performing the step S35 when a part of the film has been detected to be gripped between the first and second gripping head parts; performing the step S30 again when no film has been detected to be gripped between the first gripping head part and second gripping head part.

13. The film stripping method according to claim 12, wherein the film stripping device further comprises a second guide rail on which an end of the first guide rail is slidably disposed, the fixing mechanism is located above the stripping mechanism, a movement range of the first guide rail is formed into a parallelogram region as the first guide rail slides along the second guide rail, and an orthographic projection of the fixing mechanism towards the stripping mechanism is located within the parallelogram region, and wherein a corner of the film is adhered to the roller body in the step S20a, and the step S20 further comprises the following step which is performed at the same moment of the step S20b:

step S20c: controlling the first guide rail to move by the preset distance along the second guide rail, and wherein the step S40 comprises: controlling the stripping mechanism to move along the first guide rail while controlling the first guide rail to move along the second guide rail.

14. The film stripping method according to claim 13, wherein both the first gripping head part and second gripping head part are provided with air jet apertures on their opposite gripping surfaces, and the film stripping device further comprises an air supply mechanism which is communicated with the air jet apertures, and wherein the film stripping method further comprises the following steps which are performed after step S40:

step S50: controlling the first and second gripping head parts to move away from each other, and step S60: ejecting air into the air jet apertures by using the air supply mechanism.

15. A film stripping device comprising:

a fixing mechanism for fixing a substrate on which a film to be stripped is disposed; and a stripping mechanism comprising a stripping member for stripping at least a part of an edge of the film and a gripping member for gripping the part, stripped by stripping member, of the edge of the film and movable relative to the fixing mechanism so that the film is stripped from the substrate, wherein the stripping member comprises a stripping roller which comprises a spindle and a roller body rotatably disposed on the spindle, the roller body being provided with adhesive material on its surface so that the film is adhered to the surface of the roller body as the roller body rolls along the film, wherein the film stripping device further comprises a first guide rail spaced apart from a fixing surface of the fixing mechanism, and the stripping mechanism is slidably disposed on the first guide rail, wherein the gripping member comprises a gripping linear piston cylinder and a gripping head which comprises a first gripping head part and a second gripping head part disposed opposite to each other, the first gripping head part being disposed on a barrel of the gripping linear piston cylinder and the second gripping head part being disposed on a first piston rod of the gripping linear piston cylinder, wherein the first gripping head part has a first gripping surface and the second gripping head part has a second gripping surface opposite to the first gripping surface, and air jet apertures are formed on both the first and second gripping surfaces; and wherein the film stripping device further comprises an air supply mechanism which is communicated with the air jet apertures.

16. The film stripping device according to claim 15, wherein the film stripping device further comprises a second guide rail on which an end of the first guide rail is slidably disposed.

17. The film stripping device according to claim 16, wherein the fixing mechanism is located above the stripping mechanism, a movement range of the first guide rail is formed into a parallelogram area as the first guide rail slides along the second guide rail, and an orthographic projection of the fixing mechanism towards the stripping mechanism is located within the parallelogram area.

18. The film stripping device according to claim 15, wherein the film stripping device further comprises a recovery mechanism for recovering the stripped film; and wherein the stripping mechanism further comprises a rotary piston cylinder, which includes:

a barrel slidably disposed on the first guide rail;

a third piston rod; and a rotary shaft connected with the third piston rod of the rotary piston cylinder, wherein a linear movement of the third piston rod of the rotary piston cylinder is converted into a rotary movement of the rotary shaft; and wherein the rotary shaft of the rotary piston cylinder is connected with the barrel of the gripping linear piston cylinder so as to rotate the first gripping head part and second gripping head part to an inlet of the recovery mechanism.

19. The film stripping device according to claim 15, wherein the fixing mechanism comprises an absorbing platform located above the stripping mechanism, and the absorbing platform is provided with absorbing apertures on its absorbing surface such that the absorbing surface is formed as the fixing surface, wherein the absorbing platform is further provided with a buffering material layer on the absorbing surface, and the absorbing apertures extend through the buffering material layer in a thickness direction of the buffering material layer.

20. A film stripping device comprising:

a fixing mechanism for fixing a substrate on which a film to be stripped is disposed; and a stripping mechanism comprising a stripping member for stripping at least a part of an edge of the film and a gripping member for gripping the part, stripped by stripping member, of the edge of the film and movable relative to the fixing mechanism so that the film is stripped from the substrate, wherein the fixing mechanism comprises an absorbing platform located above the stripping mechanism, and the absorbing platform is provided with absorbing apertures on its absorbing surface such that the absorbing surface is formed as the fixing surface, wherein the absorbing platform is further provided with a buffering material layer on the absorbing surface, and the absorbing apertures extend through the buffering material layer in a thickness direction of the buffering material layer.

* * * * *